Sept. 14, 1954 L. P. PHILLIPS 2,688,815
EXTENDABLE FISH LANDING NET
Filed July 30, 1952 2 Sheets-Sheet 1
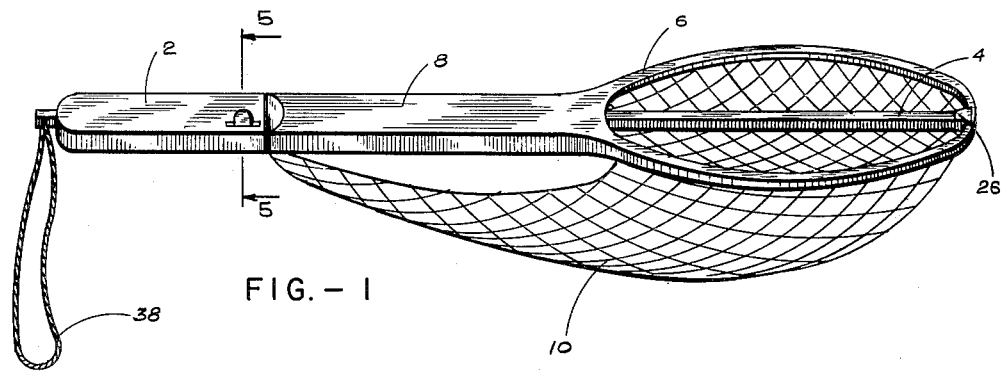
FIG.—1
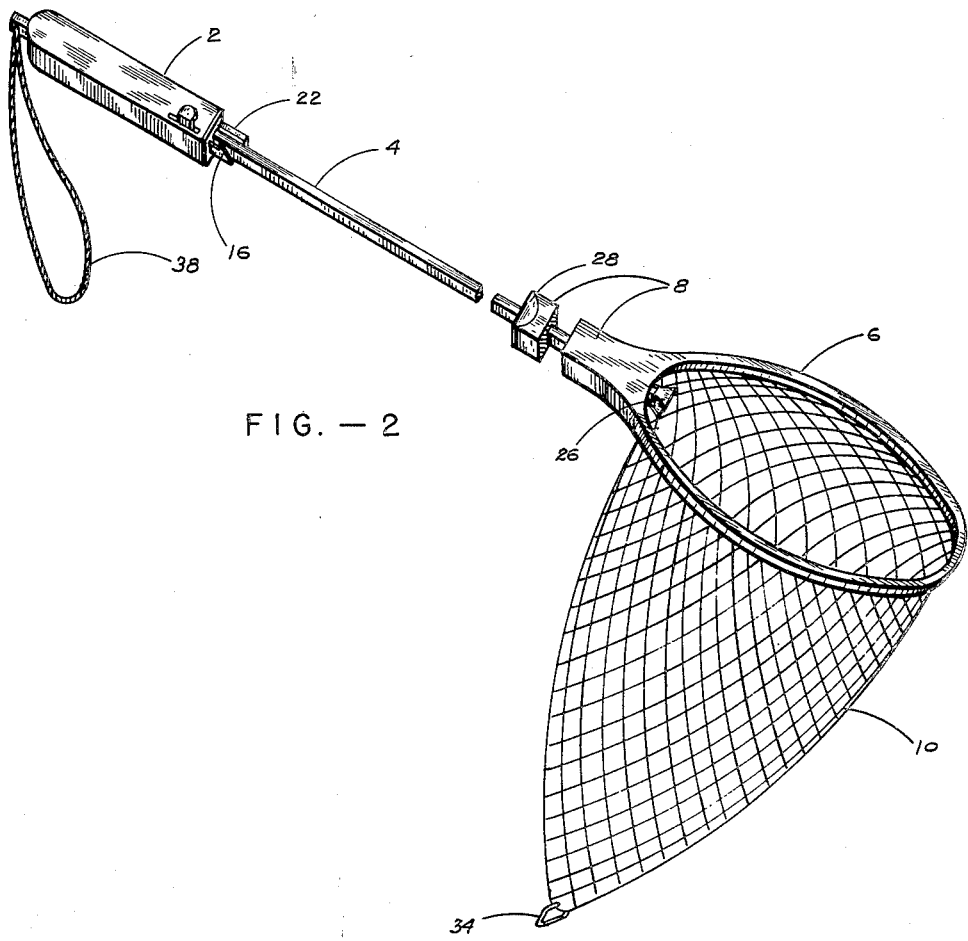
FIG.—2
INVENTOR.
Lafayette P. Phillips
BY
*Richard D. Law*
ATTORNEY Sept. 14, 1954      L. P. PHILLIPS      2,688,815
EXTENDABLE FISH LANDING NET
Filed July 30, 1952      2 Sheets-Sheet 2
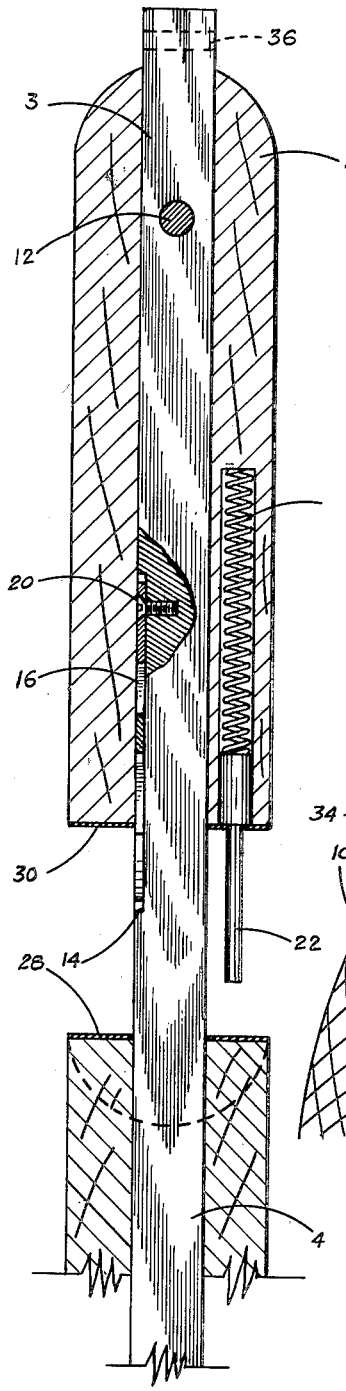
FIG.-3
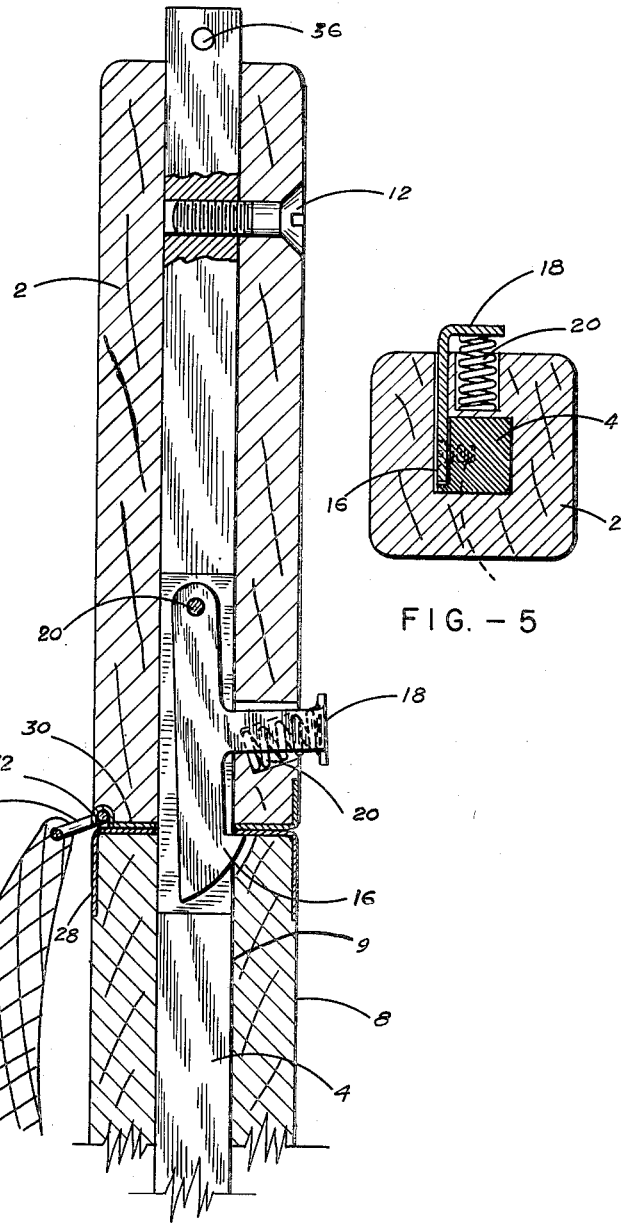
FIG.-4
FIG.-5
INVENTOR.
Lafayette P. Phillips
BY
Richard D. Law
ATTORNEY Patented Sept. 14, 1954

2,688,815

UNITED STATES PATENT OFFICE 2,688,815

EXTENDABLE FISH LANDING NET

Lafayette P. Phillips, Denver, Colo.

Application July 30, 1952, Serial No. 301,640

1 Claim. (Cl. 43—12)

This inventon relates to a fish landing net, and in particular to a fish landing net in which the handle section thereof may be lengthened to facilitate use.

Included among the objects and advantages of the present invention is a fish landing net having extendable means adapted to extend the length of the handle thereof for use, and adapted to be secured in shortened position for ease of carrying. Also included is a fish landing net in which the net portion thereof may be folded along and secured to the frame to facilitate carrying, and to release on extending the handle to facilitate use. Other objects and advantages will be apparent by referring to the following description.

In general, the device of the present invention comprises a frame having a net thereon, a handle portion and an extension member which lies within the confines of the frame member when the device is in carrying position. A lock member secures the device in closed position, and is releasable for extending the net to useable position.

Normally, a fisherman, while traversing the terrain and while actively engaged in fishing, desires a short landing net which will not hamper normal actions. A short handled net, however, is inconvenient for landing caught fish in the majority of cases, since the fisherman is usually in an awkward and unbalanced position. A fighting fish and unsure footing rarely lends itself to facile movements required in the use of a short landing net. Usually a fisherman attaches the landing net by means of an elastic to some portion of his apparel, and the use of a short net while so attached is awkward at best.

Applicant's invention provides a device which may be attached and carried according to normal use of the short landing nets commonly used in the sport. However, when a landing net is required, applicant's device instantly provides a net with an elongated handle effectively overcoming the disadvantages of the prior nets. Furthermore, with applicant's novel net holding means, the net portion of the device is held in such a manner as to diminish the likelihood of snagging on various obstacles encountered along the fishing course. The net securing means also provides a weight at the apex of the net to aid in extending the net to "catching" position. The device finds great utility not only for pedestrian fishermen, but also for sportsmen fishing from a boat. The net is especially desirable for use in boats having high gunwales, where a short net requires undue body extension to submerge the net for the catch.

The device of the invention may be more fully understood by reference to the following detailed illustrations, but is not intended to be limited thereby.

In the drawings:

Figure 1 is a perspective view of a device according to the invention, in closed or carrying position;

Figure 2 is a perspective view of the device in extended or operating position;

Figure 3 is a sectional view of a portion of the device illustrated in Figure 1;

Figure 4 is a partial sectional elevation of the lock mechanism; and

Figure 5 is a sectional front elevation of the lock mechanism.

The device selected for illustration comprises a handle 2, and extension member 4, and a net carrying frame 6. The frame has a shank portion 8 extending laterally therefrom, and a woven net 10 is attached to the frame in any suitable manner. The handle portion 2 has a passage 3 extending longitudinally therethrough, and the extension rod is adapted to fit snugly in the handle passage. The parts are secured together by a bolt 12. The extension rod is preferably made of metal and has a shallow recess 14 at the point of mergence of the rod from the handle. A lock mechanism fits in the recess so as to present a smooth slide area along the side of the rod. The lock mechanism comprises a catch 16, and an integral trigger 18, fastened to the rod by means of the bolt 20. The lock is under spring tension by means of a spring 22 set in a slightly angled hole beneath the trigger. As the catch rotates around the anchor point 20, it is desirable to set the spring at a slight angle to the face of the trigger, so that pressure against the spring will be axial. A spring-activated plunger 22 telescopes into the handle alongside the rod, and provides activating power for separating the handle and the frame.

The frame has a passage 9 therethrough, and when assembled on the rod it slides freely thereon. An enlarged head 26 prevents accidental removal of the frame from the rod. A plate member 28 is placed over the end of the shank and acts as a guide for the rod and as a lock plate for the catch 16.

A plate member 30 is secured over the inside end of the handle, and has an open slot 32 along the bottom thereof. A rectangular ring 34, securely attached to the apex of the net 10, fits in the slot 32, and when the frame is adjacent the handle the ring is securely held in the slot. On release of the trigger the handle and frame separate, releasing the net. The ring also provides weight for aiding in extending the net to full opening.

A lateral passage 36, in the rod end extending beyond the handle, is adapted to receive an elastic cord 38 threaded therethrough.

For use, the device is generally attached to the fisherman's apparel by the cord 38. For normal movement the net is generally carried in closed position with the net ring secured in the slot 32, whereby the net is folded back along the frame out of the way. In this position, the rod 4 extends across the diameter of the frame and abuts the side opposite the shank. The closed landing net is conveniently carried, and the folded net minimizes snags. When it is desired to use the net, the handle is grasped, and the frame turned slightly below horizontal. On releasing the trigger, the spring-activated plunger 22 forces the frame away from the handle, and gravity aids in the further extension. The net which has been folded along the frame is released on release of the trigger and falls to operating position. The extended net permits greater freedom in landing the fish without the usual stooping and unbalancing. When the fish is netted, the frame is turned up slightly above horizontal, permitting the frame to slide back to the handle in the shortened position. In this position, the rod extending across the frame diameter may be utilized for stunning the fish, by striking the fish thereagainst. The shortened net provides accessibility for removing the fish.

Others may readily adapt the invention for use under various conditions of service, by employing one or more of the novel features disclosed or equivalents thereof. As at present advised with respect to the apparent scope of my invention, I desire to claim the following subject matter:

An extendable fish landing net of the character described comprising a handle having a longitudinal passage therethrough, a net carrying frame having a longitudinal passage through the shank portion thereof, an extension rod passing through each of said passages, said handle immovably secured to said rod, said frame being reciprocably mounted on said rod between said handle and the end thereof, stop means adjacent the end of said rod to limit movement of said frame, a spring activated plunger telescopically disposed in said handle adapted to retract into said handle when said frame is moved toward said handle and provide activating power for separating said handle and said frame, lock means in said handle comprising a spring tension catch and an activating trigger adapted to releasably secure said frame adjacent said handle, said rod extending through said shank and abutting the frame opposite said shank position when the device is in closed position, a ring secured to the net at the apex thereof, said handle being provided with a slot which is adapted to be closed by said frame when the frame is in abutting position with said handle whereby said net is held folded against said frame.

References Cited in the file of this patent

UNITED STATES PATENTS

| Number | Name | Date |
| --- | --- | --- |
| 879,402 | Myrhow | Feb. 18, 1908 |
| 941,961 | Spiegel | Nov. 30, 1909 |
| 1,894,192 | Olson | Jan. 10, 1933 |
| 1,921,323 | Purdon | Aug. 8, 1933 |
| 2,245,993 | McCoy | June 17, 1941 |
| 2,630,646 | Jensen et al. | Mar. 10, 1953 |